US008787766B1

(12) United States Patent
Shu et al.

(10) Patent No.: US 8,787,766 B1
(45) Date of Patent: Jul. 22, 2014

(54) CHIP SCALE FIBER OPTIC TRANSMITTER, RECEIVER, TRANSCEIVER

(75) Inventors: Golden G. Shu, Redondo Beach, CA (US); Ronald Hays, Simi Valley, CA (US)

(73) Assignee: Teledyne Technologies Incorporated, Thousand Oaks, CA (US)

(*) Notice: Subject to any disclaimer, the term of this patent is extended or adjusted under 35 U.S.C. 154(b) by 630 days.

(21) Appl. No.: 12/641,070

(22) Filed: Dec. 17, 2009

(51) Int. Cl.
*H04B 10/00* (2013.01)
*G02B 6/36* (2006.01)
*G02B 6/26* (2006.01)

(52) U.S. Cl.
USPC ............ 398/139; 398/138; 385/92; 385/93; 385/45

(58) Field of Classification Search
CPC .... G02B 6/125; G02B 6/2804; G02B 6/4292; G02B 6/4246; G02B 6/4201; G02B 6/4214; G02F 1/3137; H04B 10/40
USPC ................................................ 398/139, 138
See application file for complete search history.

(56) References Cited

U.S. PATENT DOCUMENTS

| | | | | | |
|---|---|---|---|---|---|
| 4,215,937 | A | * | 8/1980 | Borsuk | 356/73.1 |
| 4,307,934 | A | * | 12/1981 | Palmer | 385/93 |
| 4,781,431 | A | * | 11/1988 | Wesson et al. | 385/79 |
| 4,836,637 | A | * | 6/1989 | Poorman et al. | 385/60 |
| 4,889,399 | A | * | 12/1989 | Mariani et al. | 385/35 |
| 4,989,946 | A | * | 2/1991 | Williams et al. | 385/16 |
| 5,050,953 | A | * | 9/1991 | Anderson et al. | 385/89 |
| 5,097,524 | A | * | 3/1992 | Wasserman et al. | 385/73 |
| 5,142,602 | A | * | 8/1992 | Cabato et al. | 385/87 |
| 5,455,880 | A | * | 10/1995 | Reid et al. | 385/87 |
| 5,551,968 | A | * | 9/1996 | Pan | 65/387 |
| 5,562,839 | A | * | 10/1996 | Pan | 216/26 |
| 5,608,831 | A | * | 3/1997 | Pan | 385/85 |
| 5,845,024 | A | * | 12/1998 | Tsushima et al. | 385/33 |
| 6,497,518 | B1 | * | 12/2002 | Deane | 385/92 |
| 6,527,456 | B1 | * | 3/2003 | Trezza | 385/89 |
| 6,792,171 | B2 | * | 9/2004 | Hargis et al. | 385/14 |
| 6,851,870 | B1 | * | 2/2005 | Deng et al. | 385/93 |
| 6,889,010 | B2 | * | 5/2005 | Trezza | 398/130 |
| 7,011,455 | B2 | * | 3/2006 | Luo et al. | 385/88 |
| 7,306,377 | B2 | * | 12/2007 | Ellison | 385/88 |
| 7,756,370 | B2 | * | 7/2010 | Hayasaka | 385/51 |
| 2002/0001324 | A1 | * | 1/2002 | Miyokawa et al. | 372/43 |
| 2003/0034498 | A1 | * | 2/2003 | Takagi | 257/98 |
| 2003/0040596 | A1 | * | 2/2003 | Nakamura et al. | 528/10 |
| 2003/0206703 | A1 | * | 11/2003 | Chiu et al. | 385/93 |
| 2004/0258364 | A1 | * | 12/2004 | Frojdh et al. | 385/74 |
| 2007/0122084 | A1 | * | 5/2007 | Stephen | 385/79 |
| 2007/0263959 | A1 | * | 11/2007 | Durrant et al. | 385/53 |
| 2008/0080812 | A1 | * | 4/2008 | Kobayashi et al. | 385/35 |
| 2009/0214165 | A1 | * | 8/2009 | Shimotsu et al. | 385/79 |
| 2009/0252459 | A1 | * | 10/2009 | Nielson et al. | 385/79 |
| 2009/0323076 | A1 | * | 12/2009 | Li et al. | 356/479 |

OTHER PUBLICATIONS

2000 Annual Report, Teledyne Technologies.
Golden Shu, et al., "Design and Evaluation of Fiber Tip Lenses for Fiber Optic Transmitter and Receiver Applications," IEEE 2007.

* cited by examiner

*Primary Examiner* — Ken Vanderpuye
*Assistant Examiner* — Abbas H Alagheband
(74) *Attorney, Agent, or Firm* — K&L Gates LLP (57) ABSTRACT

A chip scale fiber-optic device that includes a transducer that sends and receives information signals, a submount that holds the transducer in a substantially fixed position, and a multimode fiber lens that conveys the information signals between the transducer and an optical fiber.

33 Claims, 12 Drawing Sheets

CHIP SCALE FIBER OPTIC TRANSMITTER, RECEIVER, TRANSCEIVER

FIELD OF THE DISCLOSURE

The disclosure relates to a fiber optic device, a method for manufacturing the fiber optic device, and a method for assembling the fiber optic device. The fiber optic device may comprise a transmitter, a receiver, and/or a transceiver.

BACKGROUND OF THE DISCLOSURE

Fiber-optic communication systems continue to revolutionize the communications industry, becoming evermore ubiquitous. Recent developments in fiber-optic links have dramatically increased data throughput rates in such applications as, e.g., local area networks (LANs) and storage area networks (SANs). For instance, the 10 Gigabit Small Form Factor Pluggable (SFP) Multi Source Agreement (MSA) Group has a goal of creating a specification for a module, cage hardware, and integrated circuit (IC) interfaces for a 10 Gb hot pluggable module that converts serial electrical signals to external, serial optical or electrical signals. The technology is intended to have notable flexibility, including the capacity to support OC 192.STM64, 10 G Fiber Channel G.702, and 10 G Ethernet using, e.g., the same module.

Various fiber-optic communication systems have been designed for conveying information from one location to another location. For example, U.S. Pat. No. 5,845,024, issued on Dec. 1, 1998, relates to an optical fiber with lens and method of manufacturing the same; U.S. Pat. No. 6,527,456, issued on Mar. 4, 2003, relates to a cluster integration approach to optical transceiver arrays and fiber bundles for fiber-optic communication; U.S. Pat. No. 6,792,171, issued on Sep. 14, 2004, relates to a receiver optical sub-assembly; U.S. Pat. No. 6,851,870, issued Feb. 8, 2005, relates to a method for measuring and assembling a transceiver optical sub-assembly; U.S. Pat. No. 6,889,010, issued on May 3, 2005, relates to a star topology network with fiber interconnect on chip; U.S. Pat. No. 7,011,455, issued on Mar. 14, 2006, relates to an optoelectronic TO-package and method for laser; and U.S. Pat. No. 7,306,377, issued on Dec. 11, 2007, relates to an integrated optical sub-assembly having an epoxy chip package.

Existing fiber-optic transmitters, receivers, and transceivers are quite large, creating space and weight issues for high density applications in the high reliability sector. Retrofitting older copper infrastructures with fiber-optics for high density applications is currently difficult, or sometimes impossible to achieve with existing fiber-optic transmitters, receivers, or transceivers.

SUMMARY OF THE DISCLOSURE

The disclosure provides a chip scale fiber-optic device, which comprises a transducer configured to send and receive information signals, a submount configured to hold the transducer in a substantially fixed position, and a multimode fiber lens configured to convey the information signals between the transducer and an optical fiber. The transducer is aligned with an optical axis of the multimode fiber lens. The multimode fiber lens is integrally fabricated on a distal end of a bare fiber using, e.g., thermal fusion.

The chip scale fiber-optic device may further comprise a ferrule configured to attach to the optical fiber, and a sleeve configured to hold the ferrule in a substantially fixed position. The ferrule may comprise a recess configured to receive an optical fiber with a primary coating. The ferrule may further comprise a longitudinal channel that is configured to receive and hold the bare fiber in a substantially fixed position. The sleeve may be configured to attach to the submount and align an optical axis of the transducer with the optical axis of the multimode fiber lens.

The chip scale fiber-optic device may further comprise a communicator that is configured to communicate information, wherein the communicator is coupled to the transducer. The communicator may comprise at least one of a receiver that is configured to receive the information signals, a transmitter that is configured to transmit the information signals, and a transceiver that is configured to receive and transmit the information signals.

The chip scale fiber-optic device may further comprise a second transducer configured to send and receive second information signals, a second submount configured to hold the second transducer in a substantially fixed position, and a second multimode fiber lens configured to convey the second information signals between the second transducer and another optical fiber.

The transducer may comprise at least one of a diode, a laser diode, a photodiode, and a vertical-cavity surface-emitting laser (VCSEL).

The disclosure further provides a fiber-optic assembly, comprising a transducer configured to send and receive information signals, and a multimode fiber lens that is integrally fabricated on a distal end of a bare fiber, including core and cladding. The multimode fiber lens is configured to convey the information signals between the transducer and the optical fiber.

The fiber-optic assembly may further comprise a submount subassembly that comprises the transducer, and an optical subassembly that comprises the multimode fiber lens. The optical subassembly may comprise a ferrule that is configured to receive and hold the bare fiber, including the multimode fiber lens in a substantially fixed position, and a sleeve that is configured to hold the ferrule in a substantially fixed position. The ferrule may comprise a channel that receives the bare fiber, including the multimode fiber lens.

The fiber-optic assembly may further comprise a second transducer configured to send and receive second information signals, and a second multimode fiber lens configured to convey the second information signals between the second transducer and another optical fiber.

The disclosure further provides a method for making a fiber-optic assembly. The method comprises fabricating a multimode fiber lens on a distal end of a bare fiber, the multimode fiber lens having a fiber lens optical axis; attaching a transducer to a submount, the transducer having a transducer optical axis; and positioning the multimode fiber lens and the transducer in relation to each other. The positioning comprises aligning the fiber lens optical axis with the transducer optical axis, such that the axes are substantially parallel and concentrically.

The method may further comprise attaching a ferrule to an optical fiber, providing the bare fiber with multimode fiber lens in a channel of the ferrule, and providing the ferrule in an opening of a sleeve. The positioning may include aligning the fiber lens optical axis with the transducer optical axis, such that the axes are substantially parallel and concentrically.

The method may further comprise fabricating a second multimode fiber lens on a second optical fiber, the second multimode fiber lens having a second fiber lens optical axis, attaching a second transducer to a second submount, the second diode having a second transducer optical axis, and positioning the second multimode fiber lens and the second transducer in relation to each other. The positioning comprises aligning the second fiber lens optical axis with the second transducer optical axis.

Additional features, advantages, and embodiments of the disclosure may be set forth or apparent from consideration of the following detailed description and drawings. Moreover, it is noted that both the foregoing summary of the disclosure and the following detailed description are exemplary and intended to provide further explanation without limiting the scope of the disclosure.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

The present disclosure is further described in the detailed description that follows.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Figure 1:
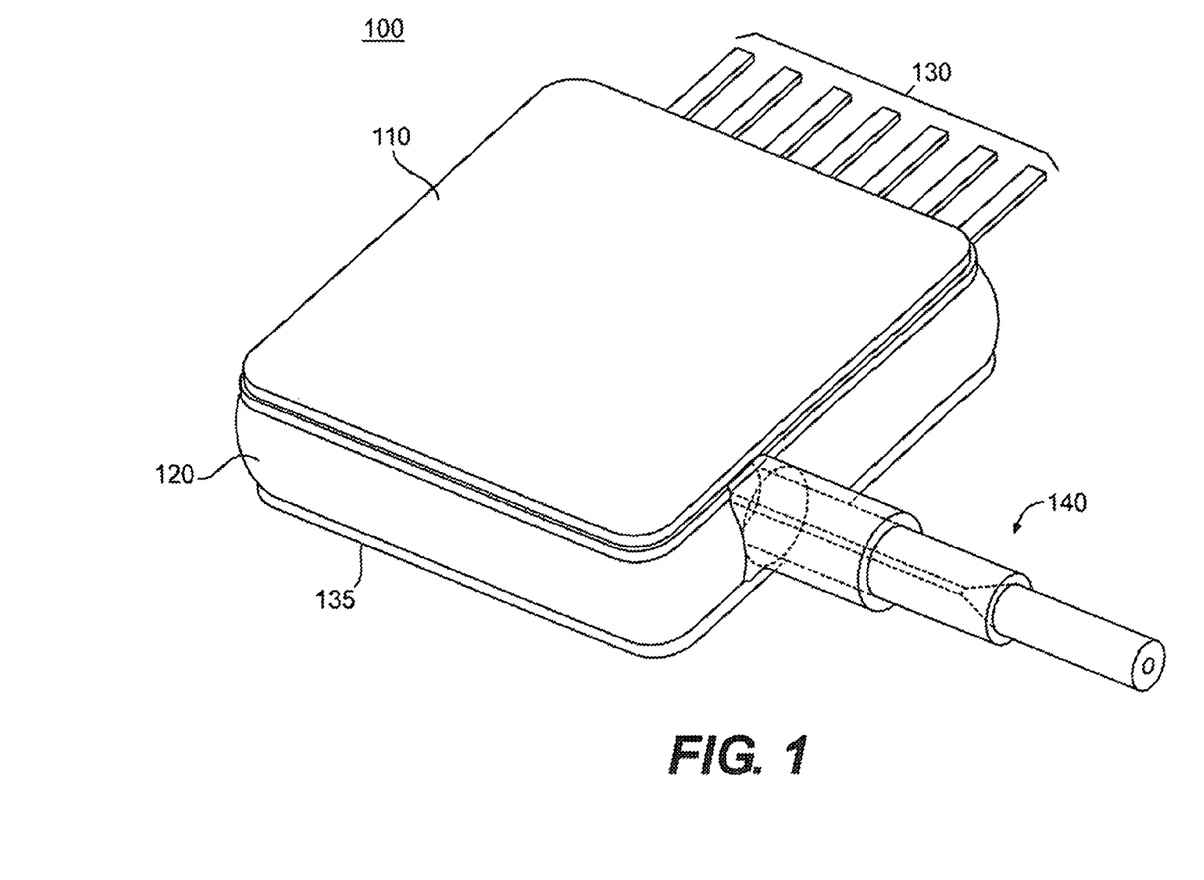
FIG. 1 shows a perspective view of an example of a fiber-optic (FO) device, according to principles of the disclosure.

FIG. 1 shows a perspective view of an example of a fiber-optic (FO) device 100, according to principles of the disclosure. The FO device 100 may include a transmitter, a receiver, and/or a transceiver, for conveying information over, e.g., one or more fiber-optic communication channels. The FO device 100 is integrated into a chip size package case that is, e.g., 0.375"×0.375"×0.1", or smaller. The chip sized package may be configured as a ball grid array (BGA) package (not shown). The FO device 100 may have a variety of data rates (e.g., 2.125 Gbps, 4.25 Gbps, 10 Gbps, 20 Gbps, 40, Gbps, 100 Gbps, or greater) and wavelengths (e.g., 780 nm, 1300 nm, 1660 nm, or greater). The FO device 100 is configured to be compatible with various fiber-optic data link and storage systems, including, but not limited to, e.g., multi-gigabit Ethernet, fiber channels, ATM/SDH/SONET, FDDI systems, and the like. The FO device 100 is configured for complete fiber optic transmitter, receiver, and transceiver applications.

The FO device 100 may include an envelope (or case) 120, one or more connectors 130, and an optical subassembly 140. The envelope 120 may include a top cover 110 and a bottom cover 135.

The envelope 120 and/or the covers 110, 135 may be made from a metal or a metal alloy (such as, e.g., aluminum, steel, lead, iron, brass, or the like), a plastic (e.g., synthetic or semi-synthetic polymers, or the like), a glass, a ceramic, or the like. The envelope 120 and covers 110, 135, may be configured to be rugged, resistant to vibration, resistant to thermal stresses, and resistant to ambient conditions (such as, e.g., rain, ice, snow, heat, wind, or the like).

The envelope 120 and covers 110, 135 may be hermetically sealed and configured to efficiently transfer heat by, e.g., heat dissipation. For example, the envelope 120 and/or covers 110, 135 may include one or more radiating fins (not shown) to increase heat dissipation, as is known in the art, by increasing the heat conducting surface area of the envelope 120 and/or covers 110, 135.

The top cover 110 and/or bottom cover 135 may be configured to be removable to allow for access to the inner components of the FO device 100.

The one or more connectors 130 may be configured as, e.g., gull wing leads for surface-mount applications, pin leads, electrical contacts, pin contacts, butterfly contacts, flip chip bonding contacts, or the like.

Figure 2:
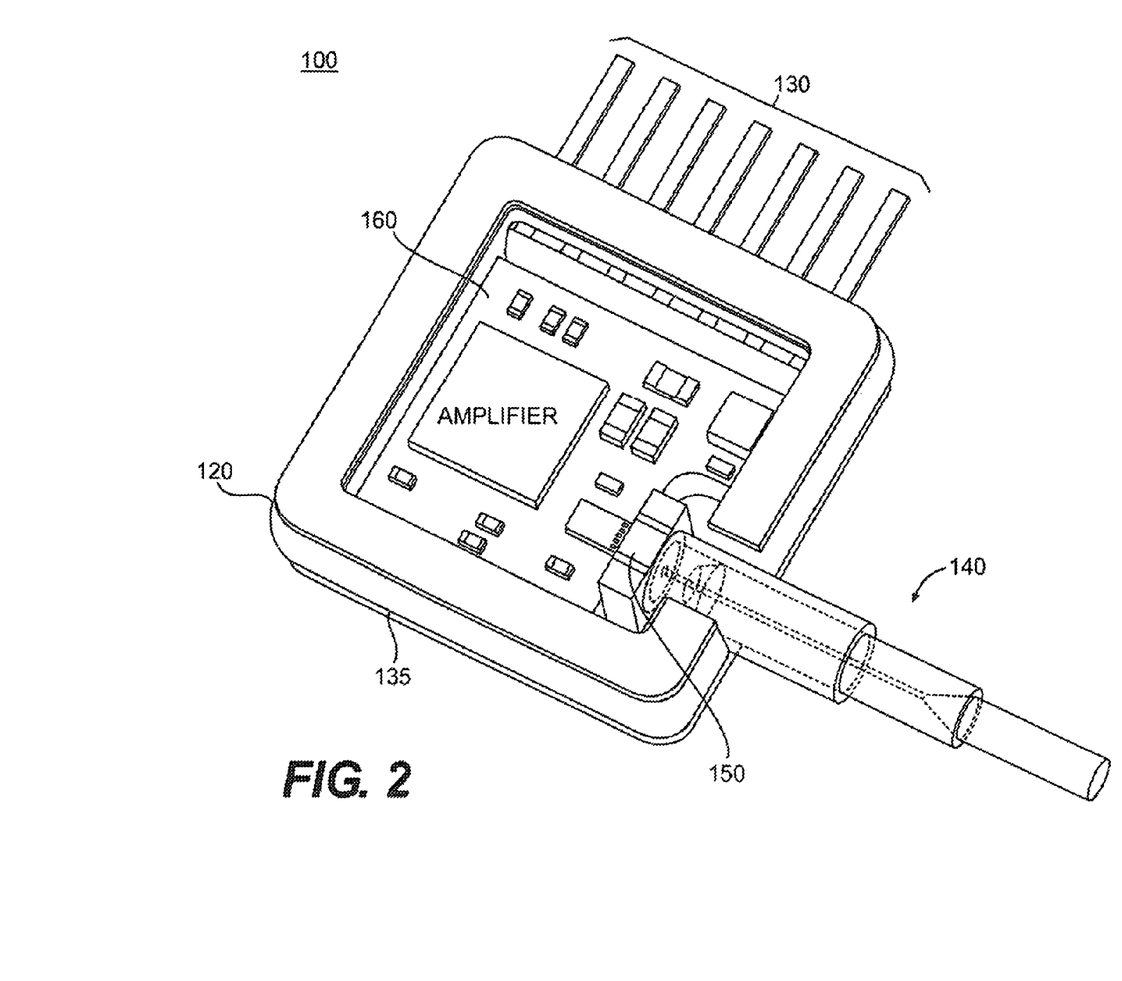
FIG. 2 shows an example of the FO device of FIG. 1 without a cover.

FIG. 2 shows an example of the FO device 100 without the top cover 110. As seen in FIG. 2, the FO device 100 may include a submount subassembly 150 and a communicator 160, which may include at least one of, e.g., a receiver, a transmitter, and/or a transceiver circuit board.

Figure 3:
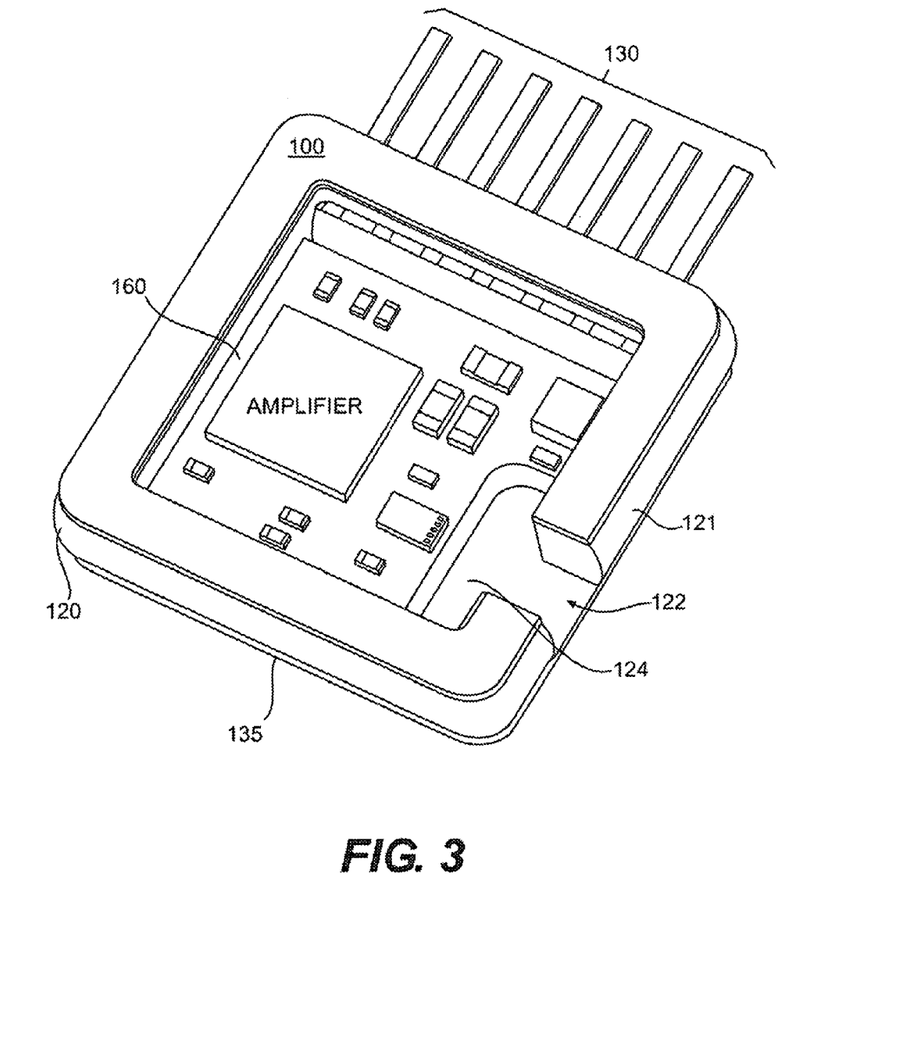
FIG. 3 shows the FO device of FIG. 1 without a fiber-optic assembly.

FIG. 3 shows the FO device 100 without the top cover 110 and the submount subassembly 150. The envelope 120 includes an opening 122 for passing the optical subassembly 140 (as shown in FIG. 2) through a wall 121, as well as a cavity 124 for holding the submount assembly 150 in a fixed, secure position. The opening 122 may be configured to snugly surround and hold a portion of the optical subassembly 140 in an optimal position.

Figure 4A:
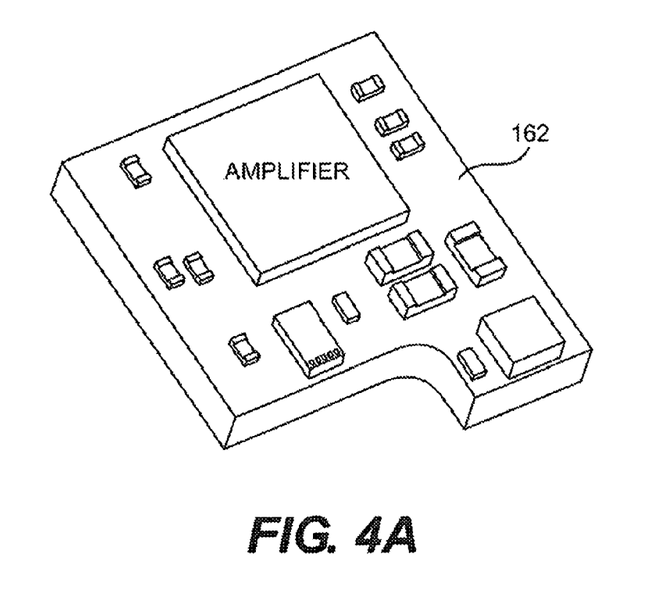
FIGS. 4A and 4B show examples of a transmitter and a receiver, respectively, that may be used in the FO device of FIG. 1.
Figure 4B:
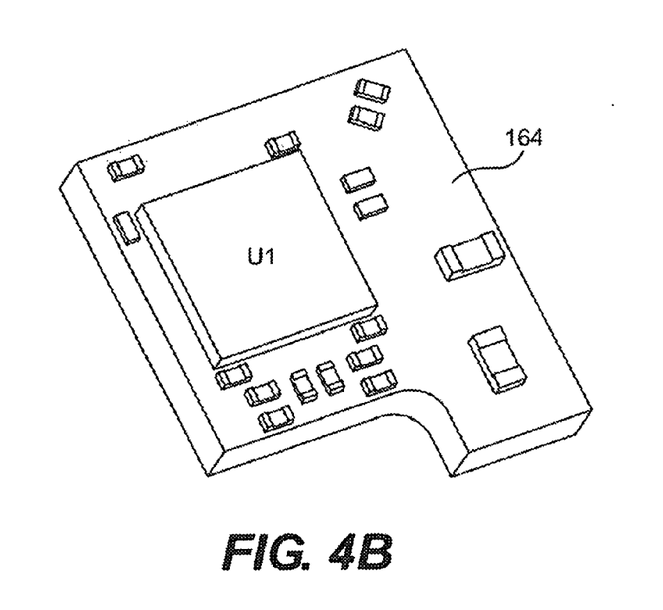

FIGS. 4A and 4B show examples of a transmitter circuit board 162 and a receiver circuit board 164, respectively, which may be used in the FO device 100. The transmitter circuit board 162 and the receiver circuit board 164 may be assembled in the envelope 120 in, e.g., a side-by-side configuration, such as one next to the other. For example, the transmitter circuit board 162 may be placed next to the receiver circuit board 164

Figure 5:
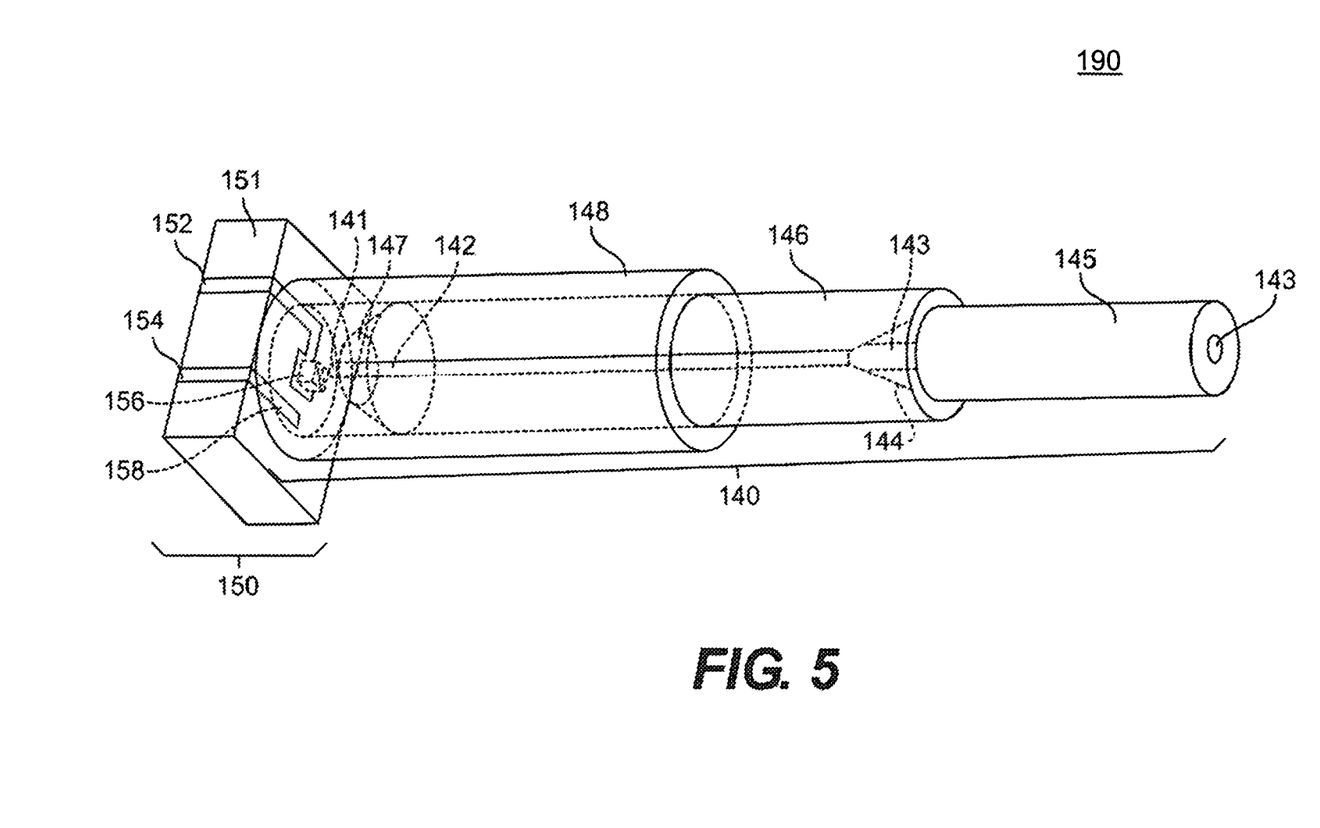
FIG. 5 shows an example of a fiber-optic assembly, according to principles of the disclosure.

FIG. 5 shows an example of a fiber-optic (FO) assembly 190, according to principles of the disclosure. The FO assembly 190 may be used, e.g., in the FO device 100 of FIG. 1. The FO assembly 190 is configured to be rugged and resistant to vibration and thermal stresses. Further, the FO assembly 190 is configured for TOSA and/or ROSA applications.

The FO assembly 190 includes the optical subassembly 140 and the submount subassembly 150. The optical subassembly 140 includes a fiber-tip (or fiber) lens 141, a bare fiber 142, an optical fiber with primary coating 143, an optical fiber with attached jacket 145, a ferrule 146, and a sleeve 148. The integrated FO assembly 190 is configured to minimize or substantially eliminate stresses on the entire optical coupling structure of the FO assembly 190, including the bare fiber 142 and a transducer 156.

The bare fiber 142, which includes a fiber core and cladding, includes a semispherical fiber-tip lens 141 at its distal end, which may have a curvature radius in the range of, e.g., about 25 μm to about 75 μm. For instance, the fiber-tip lens 141 may have a curvature radius of, e.g., about 60 μm. The fiber-tip lens 141 may have a semispherical or spherical curvature radius that may be changed per design. The fiber-tip lens 141 may be configured to provide, e.g., 80%, 90%, or nearly 100% optical coupling efficiency between the transducer 156 (also shown in FIG. 7B) and the optical fiber 145. For example, The fiber-tip lens 141 may provide nearly 100% optical coupling efficiency between a 850 nm vertical cavity surface emitting laser (VCSEL) to a multimode optical fiber 145, which may have a diameter of, e.g., but not limited to, about 900 μm, and from optical fiber 145 to a photodiode (PD).

The fiber-tip lens 141 may be either a multimode or a single mode fiber lens that is formed on substantially the entire fiber tip of the bare fiber 142, including the core and cladding, rather than only onto the core.

The fiber-tip lens 141 may be configured to receive a light beam (e.g., a laser beam) having a wavelength of, e.g., but not limited to, about 1310 nm with an FWHM angle of, e.g., but not limited to, about 36° in the vertical direction and an FWHM angle of, e.g., but not limited to, about 9° in the horizontal direction. For this configuration of the fiber-tip lens 141, an optical coupling efficiency of over 80% may be achieved, using an edge emitting laser (EEL) optically coupled to a standard multimode fiber 145.

The fiber-tip lens 141 may, in fact, receive and convey light beams having a wavelength in the range of, e.g., about 780 nm and about 1660 nm. Of course, other wavelengths are contemplated, including wavelengths shorter than 780 nm and longer than 1660 nm, so long as the fiber-tip lens 141 is properly selected. Generally, the applicable data rate is not limited by the fiber-tip lens 141. The applicable data rates may include, e.g., 2.125 Gbps, 4.25 Gbps, 10 Gbps, 20 Gbps, 40 Gbps, 100 Gbps, or more.

Further, the fiber-tip lens 141 may have a curvature radius of, e.g., but not limited to, about 5 μm to about 70 μm when the fiber-tip lens 141 is fabricated on, e.g., a standard 50 μm (core)/125 μm (cladding) multimode bare fiber 142 or 8.3 μm/125 μm single-mode bare fiber 142. Still further, the fiber-tip lens 141 may have a curvature radius in the range of about 50 μm to about 63 μm when the bare fiber 142 is inserted into a matched ferrule 146 of ID=127 μm. The fiber-tip lens 141 may be fabricated on any type of bare fiber 142, including, e.g., but not limited to, 100 μm/140 μm or larger, or 6 μm/80 μm or smaller.

The transducer 156 is configured to generate and/or receive information signals in the form of energy signals, such as, e.g., laser beams. The transducer 156 may include, e.g., a diode, a laser diode (LD), an edge emitting laser diode, a photodiode (PD), and a vertical-cavity surface-emitting laser (VCSEL), or the like.

The optical fiber with attached jacket 145 includes an optical fiber with primary coating 143 that conveys the light beams between the transducer 156 and a remote transmitter (not shown), receiver (not shown), or transceiver (not shown). The optical fiber with primary coating 143, which may have a diameter of, e.g., but not limited to, about 250 μm, may be shielded, as is known in the art. The optical fiber 145 may also include a bare fiber 142, such as, e.g., a 100 μm/140 μm, or larger multimode (MM) fiber, or 6 μm/80 μm, or smaller single mode (SM) fiber.

In the optical subassembly 140, the fiber-tip lens 141 may be integrally formed with the bare fiber 142. For example, the fiber-tip lens 141 may be directly fabricated on the tip of the bare fiber 142 using a thermal fusion approach. This construction provides a small, compact, rugged, and naturally shock and vibration resistant configuration for the optical subassembly 140, including the fiber-tip lens 141 and bare fiber 142, since the fiber-tip lens 141 is integrated with the bare fiber 142.

Alternatively, the fiber-tip lens 141 may be attached or coupled to the bare fiber 142.

The ferrule 146 may be made from a material, such as, but not limited to, e.g., a metal, a metal alloy, a glass, a ceramic, a polymer, a plastic, or the like. The ferrule 146 may have a cylindrical shape (shown in FIG. 5), a rectangular-block shape (not shown), or any other shape capable of receiving and holding the bare fiber 142 in a substantially fixed position, resisting vibration, thermal stresses, and the like. In this regard, the ferrule 146 comprises a longitudinal channel that is configured to hold the multimode bare fiber 142 in a substantially fixed position. The ferrule 146 may include a recessed portion 144 and a beveled portion 147. The recessed portion 144 may have, e.g., a conical shape. The ferrule 146 is configured to be inserted into, or mated to the sleeve 148.

The sleeve 148 may be made from a material, such as, but not limited to, e.g., a metal, a metal alloy, a glass, a ceramic, a polymer, a plastic, or the like. The sleeve 148 may have a cylindrical shape, a rectangular-block shape (not shown), or any other shape capable of receiving and holding the ferrule 146 in a substantially fixed position, resisting vibration, thermal stresses, and the like. The sleeve 148 may include an opening for receiving and holding the ferrule 146. The sleeve 148 may be affixed to the submount subassembly 150.

The submount subassembly 150 may include a submount 151 and the transducer 156. The submount 151 may include electrical leads 152, 154. The transducer 156 may be directly coupled to lead 152, which may be a ground. The transducer 156 may be coupled to the lead 154 by means of a connector 158.

The transducer 156 may include a heat dissipater or spreader to help remove generated heat. The transducer 156 may be configured as a junction-down, bottom-emitting structure, thereby improving uniform current injection.

Figure 6A:
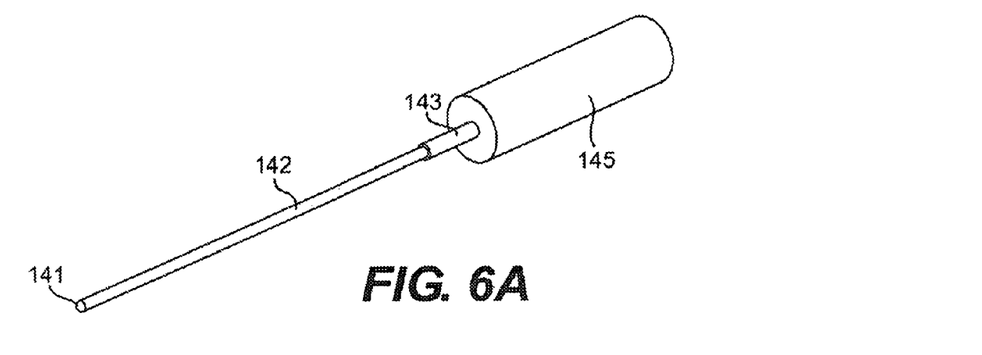
FIGS. 6A, 6B, and 6C show various stages of assembly or fabrication of an optical subassembly of the fiber-optic assembly of FIG. 5, according to principles of the disclosure.
Figure 6B:
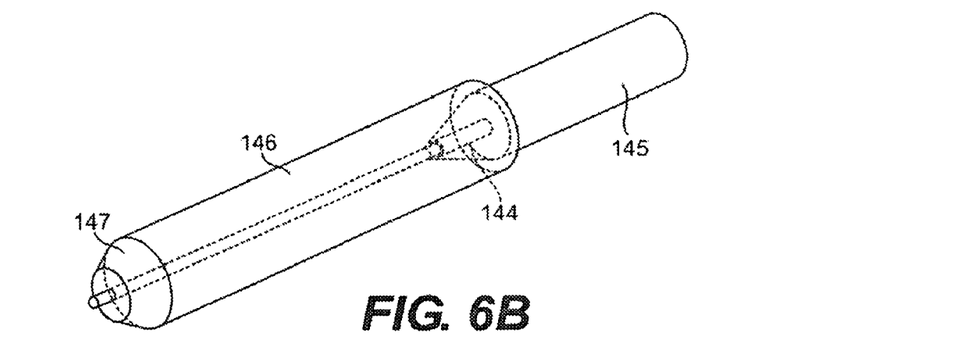
Figure 6C:
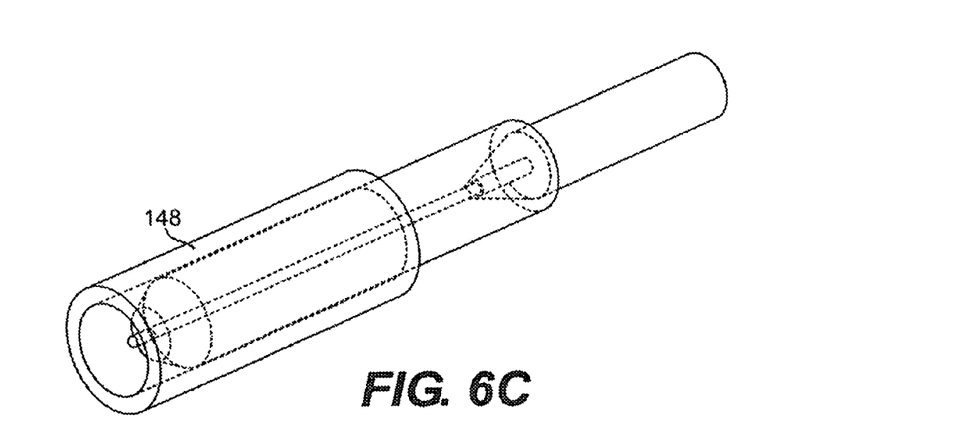

FIGS. 6A, 6B, and 6C show various stages of assembly of the optical subassembly 140, according to principles of the disclosure. For example, FIG. 6A shows the fiber-tip lens 141 integrally formed with the bare fiber 142 and the optical fiber with primary coating 143, which is provided in a shield or cover tube of the optical fiber 145; FIG. 6B further shows the fiber-tip lens 141 and bare fiber 142 placed in the ferrule 146; and FIG. 6C shows the ferrule 146 with the bare fiber 142 placed in the sleeve 148.

Figure 7A:
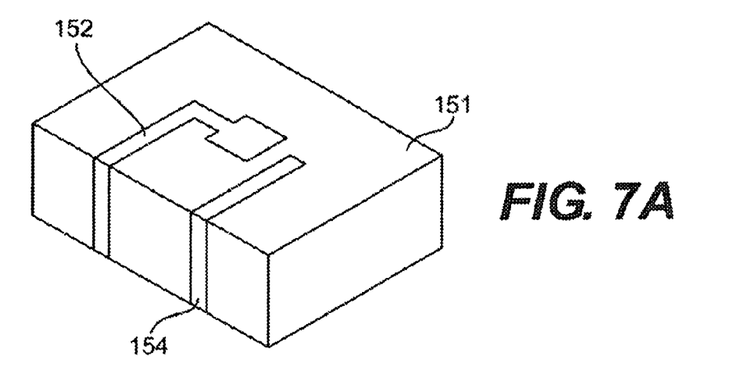
FIGS. 7A, 7B, and 7C show various stages of assembly or fabrication of a submount subassembly that may be used in the fiber-optic assembly of FIG. 5, according to principles of the disclosure.
Figure 7B:
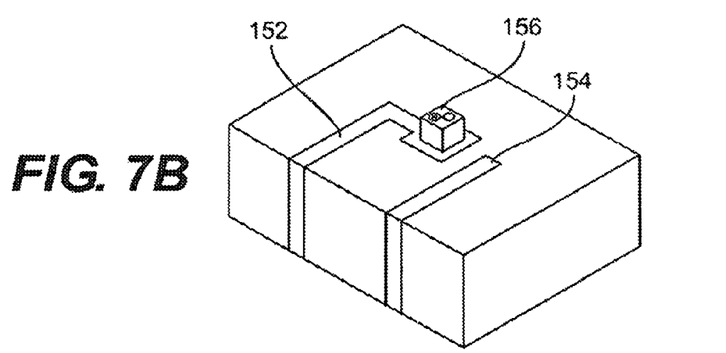
Figure 7C:
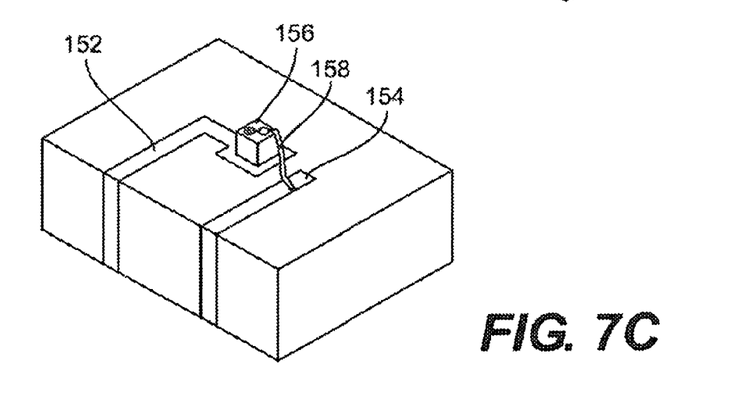

FIGS. 7A, 7B, and 7C show various stages of assembly or fabrication of a submount subassembly 150 according to principles of the disclosure. For example, FIG. 7A shows an example of the submount 151 with a pair of leads 152, 154; FIG. 7B shows the transducer 156 mounted to an area on the lead 152; FIG. 7C shows the transducer 156 connected to the lead 154 by means of the connector 158.

Figure 8:
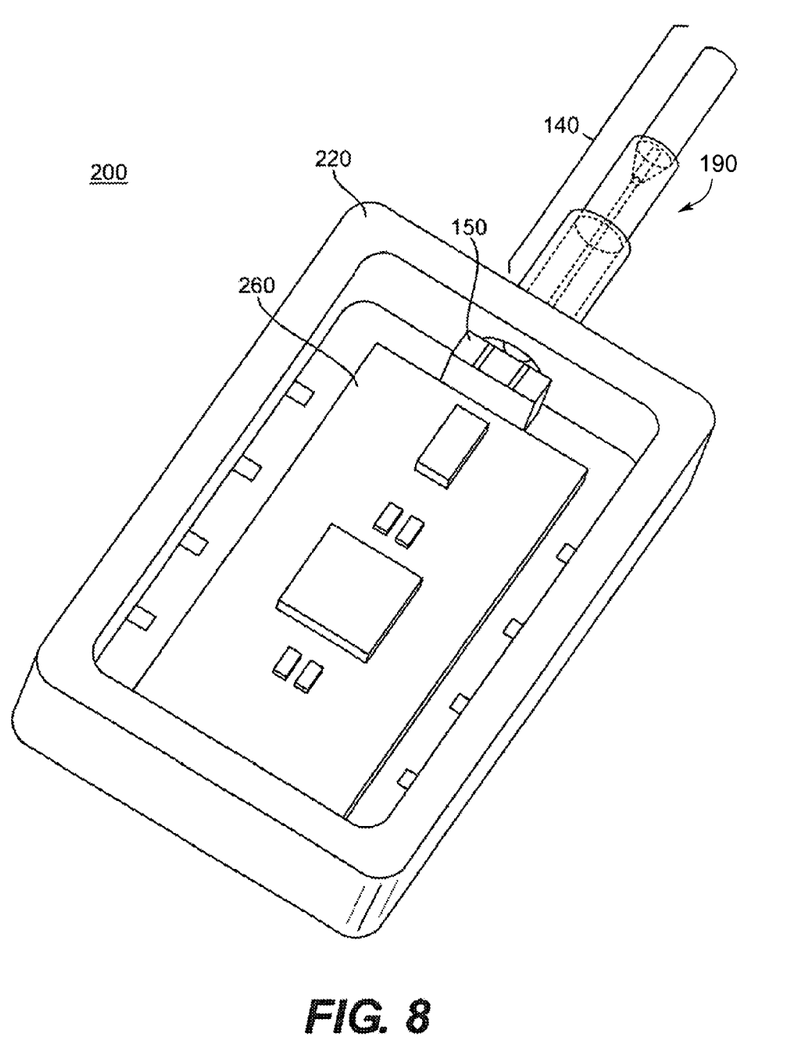
FIG. 8 shows another example of a leadless FO device without a cover, according to principles of the disclosure.

FIG. 8 shows another example of a FO device 200 without a cover, according to principles of the disclosure. As seen in FIG. 8, the FO device 200 includes an envelope 220, the optical assembly 190 (including the optical subassembly 140 and the submount subassembly 150), and a communicator 260. The communicator 260 may include at least one of, e.g., a transmitter, a receiver, and/or a transceiver.

Figure 9:
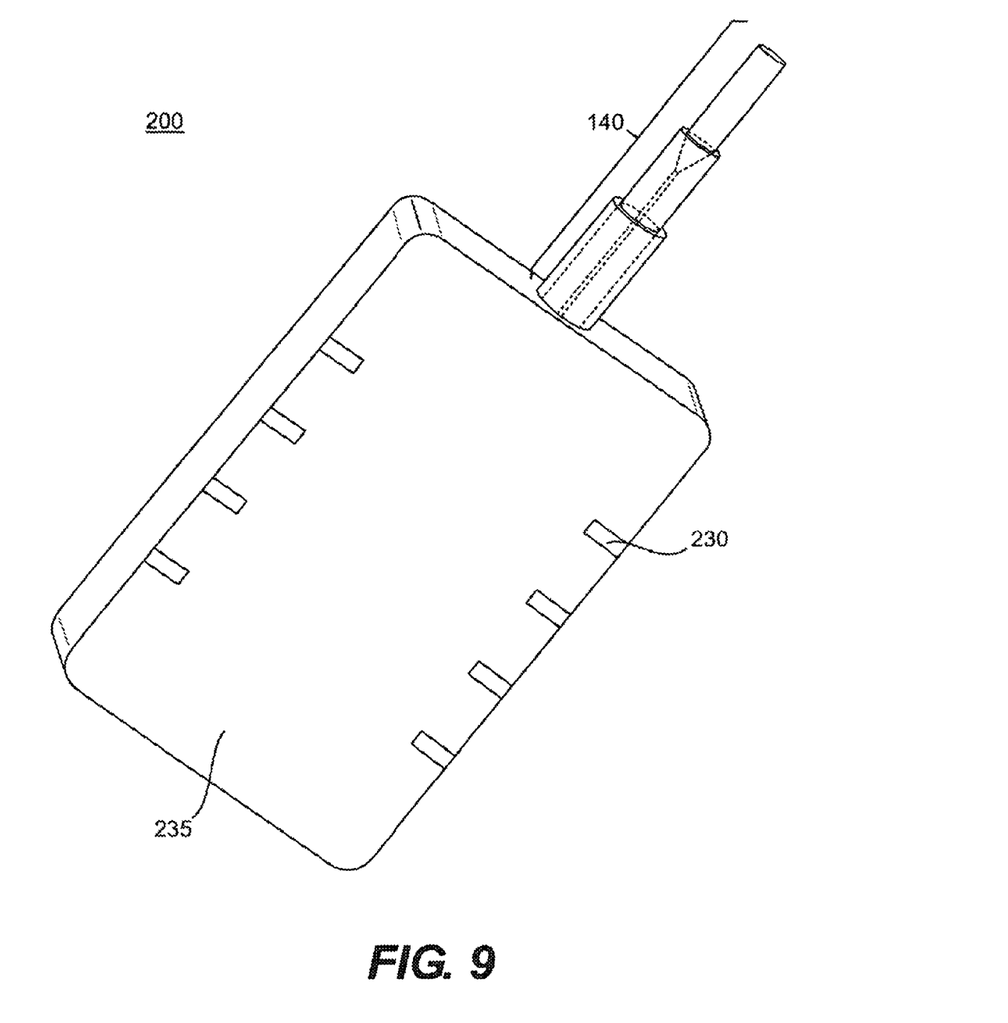
FIG. 9 shows a bottom view of the leadless FO device of FIG. 8.

FIG. 9 shows a bottom 235 of the FO device 200. As seen in FIG. 8, the envelope 220 may be uniformly formed to enclose a portion of the optical assembly 190 (e.g., the submount subassembly 150) and the communicator 260 on five sides. A cover (not shown) may be provided on the sixth side, thereby completely enclosing the communicator 260 and the portion of the optical assembly 190. The FO device 200 includes one or more electrical connectors 230. Referring back to FIG. 9, the connectors 230 may include, e.g., gull wing leads, pin contacts, butterfly contacts, flip chip bonding contacts, or the like.

Figure 10:
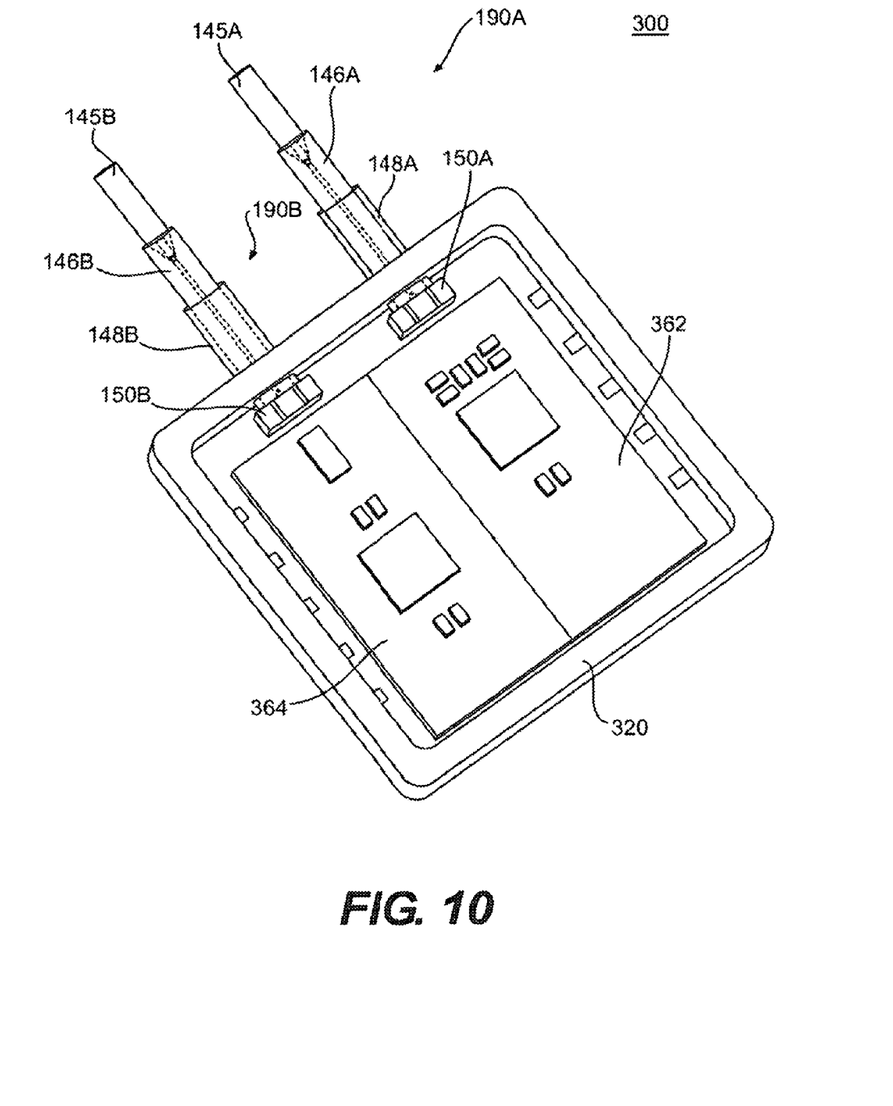
FIG. 10 shows yet another example of a leadless FO device without a cover, according to principles of the disclosure.

FIG. 10 shows yet another example of a FO device 300 without a cover, according to principles of the disclosure. The FO device 300 includes a plurality of optical assemblies 190, a plurality of communicators 362, 364, and an envelope 320. Each of the communicators 362, 364, may include a transmitter, a receiver, and/or a transceiver. The envelope 320 may include a plurality of openings, each of which may be configured to receive and hold a portion of an optical assembly 190.

Although shown as comprising a pair of optical assemblies 190 and communicators 362, 364, any number of optical assemblies and communicators may be provided in the FO device 300. Further, the communicators 362, 364, may be placed side-by-side, as shown in FIG. 10.

Figure 11:
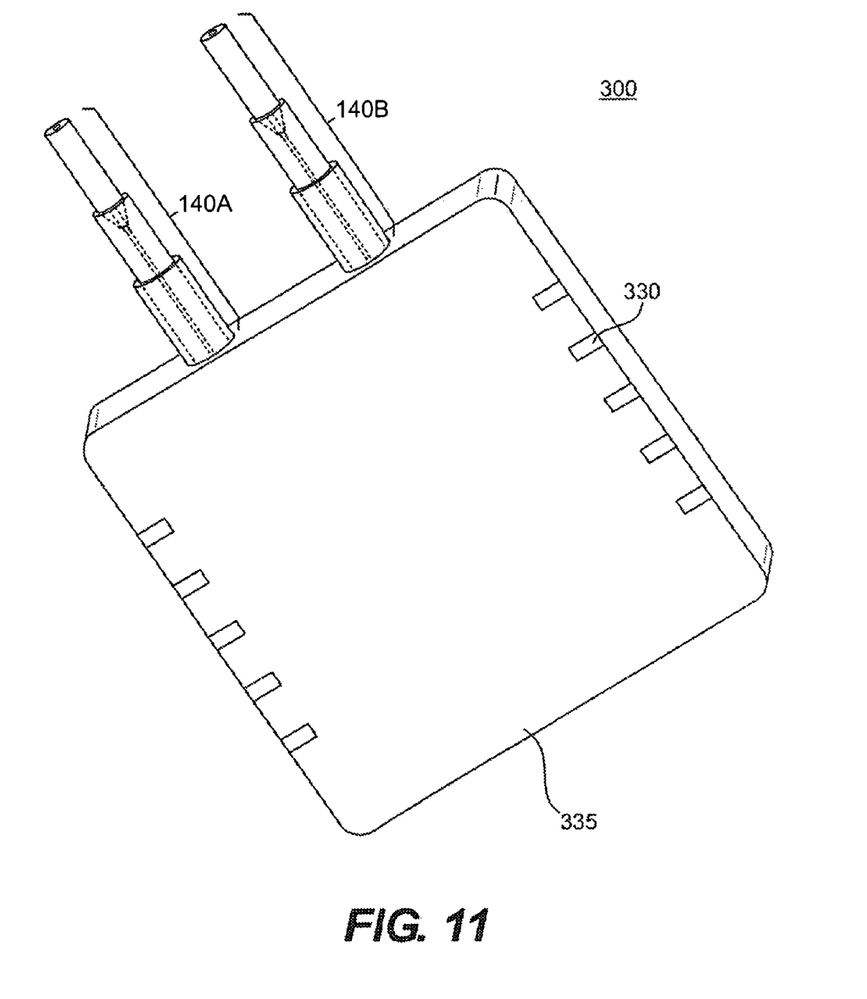
FIG. 11 shows a bottom view of the leadless FO device of FIG. 10.

FIG. 11 shows a bottom 335 of the FO device 300. As seen, the FO device 300 includes one or more electrical connectors 330. The connectors 330 may include, e.g., gull wing leads, pin contacts, butterfly contacts, flip chip bonding contacts, or the like.

Figure 12:
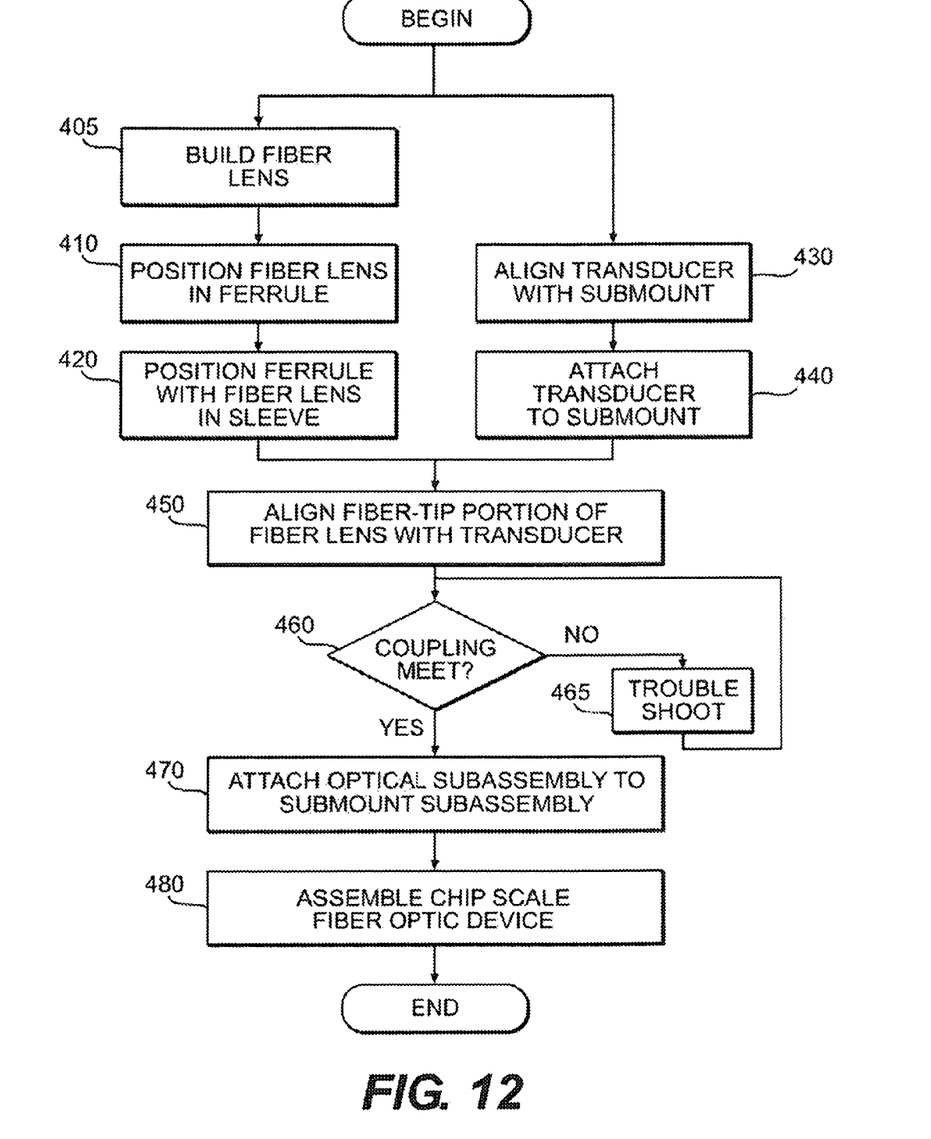
FIG. 12 shows an example of a method or process for fabricating or assembling an FO device, according to principles of the disclosure.

FIG. 12 shows an example of a method or process for fabricating or assembling an FO device, according to principles of the disclosure. The process may begin with fabricating an optical assembly 190 (e.g., shown in FIG. 5). In this regard, the optical subassembly 140 may be built at substantially the same time, or at a different time (before or after) as the submount subassembly 150.

The optical subassembly 140 may be built by designing and fabricating the multimode fiber-tip lens 141 on a distal end of the bare fiber 142 using, e.g., thermal fusion (Step 405). The fiber-tip lens 141 is fabricated to satisfy required miniaturization, while, at the same time, ensuring high (e.g., about 90% to nearly 100%) optical coupling efficiency between the transducer 156 and the optical fiber 145, which is used to convey information between the communicator 160 and a remotely located communicator (not shown), such as, e.g., a receiver, a transmitter, or a transceiver. The fiber-tip lens 141 and bare fiber 142 may be placed in a ferrule 146 (Step 410). The bare fiber 142 and ferrule 146 should be configured so as to provide a snug fit that prevents vibration, thermal stresses, ambient conditions, and the like, from impacting the bare fiber 142 and, therefore, the fiber-tip lens 141. The ferrule 146 with bare fiber 142 may then be placed in the sleeve 148 (Step 420). The sleeve 148 and ferrule 146 should be configured to provide a snug fit to prevent the ferrule 146 from moving with respect to the sleeve 148.

Alternatively, the ferrule 146 may first be placed in the sleeve 148, then, the bare fiber 142 may be placed in the ferrule 146.

The submount subassembly 150 may be built by aligning the transducer 156 with the submount 151 (Step 430) and attaching the transducer 156 to the submount 151 (Step 440). Alternatively, the transducer 156 may be integrally formed with the submount 151.

After the optical subassembly 140 and submount subassembly 150 have been built, the optical axis of the fiber-tip lens 141 may be aligned with an optical axis of the transducer 156 for optimal optical coupling efficiency (Step 450). The fiber-tip lens 141 may be configured not to contact the transducer 156, as seen, e.g., in FIG. 5. A determination may be made whether the optical axis of the fiber-tip lens 141 is optimally aligned with the optical axis of the transducer 156 (Step 460). If a determination is made that the optical axis of the fiber-tip lens 141 is optimally aligned with the optical axis of the transducer 156 (YES, Step 460), then the optical subassembly 140 may be coupled (or attached) to the submount subassembly 150 (Step 470), otherwise trouble-shooting may be carried out (Step 465) and a determination again made whether the optical axis of the fiber-tip lens 142 is optimally aligned with the optical axis of the transducer 156 (Step 460). The optical subassembly 140 and submount subassembly 150 are coupled (or attached) to build the optical assembly 190.

The optical assembly 190 is then coupled to the communicator 160 to form the chip scale FO device 100 (Step 480). This step in the process may include encapsulating the optical assembly 190 and communicator 160 into the envelope 120. The envelope 120 may have dimensions of, e.g., 0.375"×0.375"×0.1", or less.

It is noted that the method or process for fabricating or assembling an FO device may be repeated to fabricate the FO device 300, which includes a plurality of fiber-optic assemblies 190.

According to a further aspect of the invention, a computer readable medium is provided that includes an optical assembly fabrication program, which, when executed on a general purpose computer, causes each of the Steps 405 to 480 to be carried out. The optical assembly fabrication program may include a code segment or code section for carrying out each of the Steps 405 to 480.

According to aspects of the disclosure, the FO device 100 (or 200, or 300) offers the flexibility of being installable as an integrated circuit (IC) by, e.g., forming leadless and flip chip mounting the FO device 100, 200, or 300 flat on a PCB. Alternatively (or additionally), the FO device 100, 200 or 300 may be installed as a through-hole mounted component allowing for a relatively high density and reduced footprint. The FO device may include a thermal conductive base material that improves heat dissipation.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A chip scale fiber-optic device, comprising:
    a transducer configured to send and receive information signals;
    a submount configured to hold the transducer in a substantially fixed position;
    an optical fiber configured with a fiber lens thermally fused on a bare distal end of the optical fiber, the fiber lens configured to convey the information signals between the transducer and the optical fiber;
    a ferrule configured to attach to the optical fiber; and
    a sleeve configured to hold the ferrule in a substantially fixed position so that the fiber lens on the bare distal end is held in place adjacent to and separate from the transducer,
    wherein the transducer optical axis is aligned with an optical axis of the fiber lens at an optimum coupling position.

2. The chip scale fiber-optic device of claim 1, further comprising:
    a ferrule configured to attach to the optical fiber; and
    a sleeve configured to hold the ferrule in a substantially fixed position.

3. The chip scale fiber-optic device of claim 2, wherein the ferrule comprises a recess configured to receive an optical fiber with primary coating.

4. The chip scale fiber-optic device of claim 1, wherein the fiber lens is fabricated on a distal end of a bare fiber using thermal fusion.

5. The chip scale fiber-optic device of claim 2, wherein the ferrule comprises a longitudinal channel that is configured to hold the bare fiber in a substantially fixed position.

6. The chip scale fiber-optic device of claim 2, wherein the sleeve is configured to hold the ferrule at one end of the sleeve and to be attached to the submount at another end of the sleeve.

7. The chip scale fiber-optic device of claim 1, further comprising:
    a communicator that is configured to communicate information, wherein the communicator is coupled to the transducer, wherein the communicator comprises at least one of:
    a receiver that is configured to receive the information signals;
    a transmitter that is configured to transmit the information signals; and
    a transceiver that is configured to receive and transmit the information signals.

8. The chip scale fiber-optic device of claim 1, further comprising:
    a second transducer configured to send and receive second information signals;
    a second submount configured to hold the second transducer in a substantially fixed position; and
    a second fiber lens configured to convey the second information signals between the second transducer and another optical fiber.

9. The chip scale fiber-optic device of claim 1, wherein the transducer comprises at least one of:
    a diode;
    a laser diode; and
    a vertical-cavity surface-emitting laser.

10. A fiber-optic assembly, comprising:
    a transducer configured to send and receive information signals;
    a ferrule configured at a first end to attach to a bare portion of an optical fiber and configured to attach to a jacketed portion of the optical fiber at a second end;
    a fiber lens that is fabricated on a distal end of the bare portion, wherein the distal end extends beyond the first end towards the transducer; and
    a sleeve configured at a first end to hold and cover the bare portion of the optical fiber and the ferrule, and the sleeve configured at a second end to cover the transducer,
    wherein the fiber lens is configured to convey the information signals between the transducer and the optical fiber.

11. The fiber-optic assembly of claim 10, further comprising:
    a submount subassembly that comprises the transducer; and
    an optical subassembly that comprises the fiber lens.

12. The fiber-optic assembly of claim 11, wherein the optical subassembly further comprises:
    the ferrule that is configured at one end to hold the bare portion in a substantially fixed position and is aligned and affixed through the sleeve to the submount at another end; and
    a sleeve that is configured to hold the ferrule in a substantially fixed position,
    wherein the ferrule comprises a channel that receives the bare portion.

13. The fiber-optic assembly of claim 10, further comprising:
    a second transducer configured to send and receive second information signals; and
    a second fiber lens configured to convey the second information signals between the second transducer and another optical fiber.

14. A method for making a fiber-optic assembly, the method comprising:
    fabricating a fiber lens on a bare fiber, the fiber lens having a fiber lens optical axis;
    attaching a transducer to a submount, the transducer having a transducer optical axis;
    placing the bare fiber with the fiber lens in a ferrule;
    placing the ferrule with the bare fiber and the fiber lens in a sleeve to create an optical subassembly;
    positioning the optical subassembly and the transducer in relation to each other, wherein the positioning comprises aligning the fiber lens optical axis with the transducer optical axis at an optimum coupling position; and
    affixing the sleeve to the submount, the sleeve covering the transducer and the fiber lens.

15. The method of claim 14, further comprising:
    providing the bare fiber in a channel of a ferrule.

16. The method of claim 14, further comprising:
    providing the ferrule in an opening of the sleeve.

17. The method of claim 14, wherein the fabricating a fiber lens on a bare fiber, comprises:
    thermally fusing the fiber lens on both a core and a cladding of the bare fiber.

18. The method of claim 15, further comprising:
    attaching the ferrule to an optical fiber.

19. The method of claim 14, further comprising:
    fabricating a second fiber lens on a second bare fiber, the second fiber lens having a second fiber lens optical axis;
    attaching a second transducer to a second submount, the second transducer having a second transducer optical axis; and
    positioning the second fiber lens and the second transducer in relation to each other, wherein the position comprises aligning the second fiber lens optical axis with the second transducer optical axis at an optimum coupling position.

20. The chip scale fiber-optic device of claim 1, wherein the fiber lens has a tip curvature radius of about 5 μm to about 70 μm.

21. The chip scale fiber-optic device of claim 20, wherein the sleeve covers the transducer and fiber lens.

22. The chip scale fiber-optic device of claim 21, wherein the sleeve is affixed to the submount.

23. The chip scale fiber-optic device of claim 1, wherein the ferrule is configured to provide a snug fit about the bare distal end thereby preventing vibration, thermal stresses and ambient conditions from impacting the fiber lens.

24. The chip scale fiber-optic device of claim 23, wherein the ferrule comprises a bevel portion proximate the bare distal end.

25. The method of claim 15, wherein the providing step attaches a first end of the ferrule to the bare fiber proximate the fiber lens and attaches a second end of the ferrule to a jacketed portion of an optical fiber.

26. The method of claim 16, wherein the step of providing the bare fiber in a channel of a ferrule attaches a bevel portion of the ferrule to the bare fiber and the step of providing the ferrule in an opening of the sleeve positions the fiber lens so that the fiber lens optical axis is aligned with the transducer optical axis and the fiber lens is spaced apart from the transducer.

27. The method of claim 14, wherein the positioning step optimally aligns the fiber lens optical axis with the transducer optical axis.

28. The method of claim 27, further comprising the step of determining if the fiber lens optical axis is optimally aligned with the transducer optical axis at the optimum coupling position.

29. The method of claim 28, further comprising if the determining step determines that the fiber lens optical axis and the transducer optical axis are not optimally aligned at the optimum coupling position, then troubleshooting the positioning of the fiber lens and the transducer in relation to one another to optimally align the fiber lens optical axis with the transducer optical axis at the optimum coupling position.

30. The chip scale fiber-optic device of claim 1, wherein the fiber lens comprises a multimode fiber lens.

31. The method of claim 14, wherein the fiber lens comprises a multimode fiber lens.

32. The chip scale fiber-optic device of claim 1, wherein the fiber lens comprises a single mode fiber lens.

33. The method of claim 14, wherein the fiber lens comprises a single mode fiber lens.

\* \* \* \* \*